United States Patent [19]

Emani

[11] Patent Number: 5,190,460
[45] Date of Patent: Mar. 2, 1993

[54] CENTRAL OFFICE CONNECTOR FOR A DISTRIBUTING FRAME SYSTEM

[75] Inventor: Sastry V. Emani, Omaha, Nebr.
[73] Assignee: AT&T Bell Laboratories, Murray Hill, N.J.
[21] Appl. No.: 799,519
[22] Filed: Nov. 27, 1991
[51] Int. Cl.⁵ .................................... H01R 13/26
[52] U.S. Cl. ................... 439/51; 439/180; 439/482; 439/719; 439/746
[58] Field of Search ....................... 439/43–54, 439/259, 342, 482, 922, 261, 180, 746, 719

[56] References Cited

U.S. PATENT DOCUMENTS

| | | | |
|---|---|---|---|
| 3,781,763 | 12/1973 | Fesser et al. | 439/51 |
| 4,099,822 | 9/1978 | Carlisle et al. | 439/405 |
| 4,119,818 | 10/1978 | Noschese | 439/372 |
| 4,421,374 | 9/1980 | Montilla, Jr. et al. | |

Primary Examiner—Neil Abrams
Attorney, Agent, or Firm—E. W. Somers; D. E. Hayes, Jr.

[57] ABSTRACT

A connecting block (20) which includes a plurality of protectors (30,30) to protect a plurality of incoming communications lines includes a rear panel (28) which is stationary with respect to a housing (25) of the connector block. Mounted in cavities (62, 62) of the rear panel is a mass of contact elements (40,40) arranged in rows and columns and each having a rearwardly extending portion which is connected to a conductor which extend from an associated protector and an opposite portion which extends toward a front panel (60). Mounted in cavities (62,62) of the front panel is a mass of trifurcated contact elements (70,70) each having a base portion (72) and a conductor receiving portion. In a disconnected position, the opposite portion of each contact element is aligned with and overlaps a base (72) of an associated trifurcated contact element with a hook-like portion (46) being spaced from the base of the associated trifurcated contact element by a web (96) of dielectric material in each cavity. The front panel may be moved slidably toward the rear panel to cause the hook-like portion of each contact element to become disposed past the associated web and allow the hook-like portion to engage electrically the aligned, associated trifurcated contact element. As a result, electrical engagement among associated contact elements of two masses of same is affected simultaneously. Disconnection is caused by moving the front panel away from the rear panel to cause a web in each cavity to become interposed between a contact element and its associated trifurcated contact element.

16 Claims, 10 Drawing Sheets

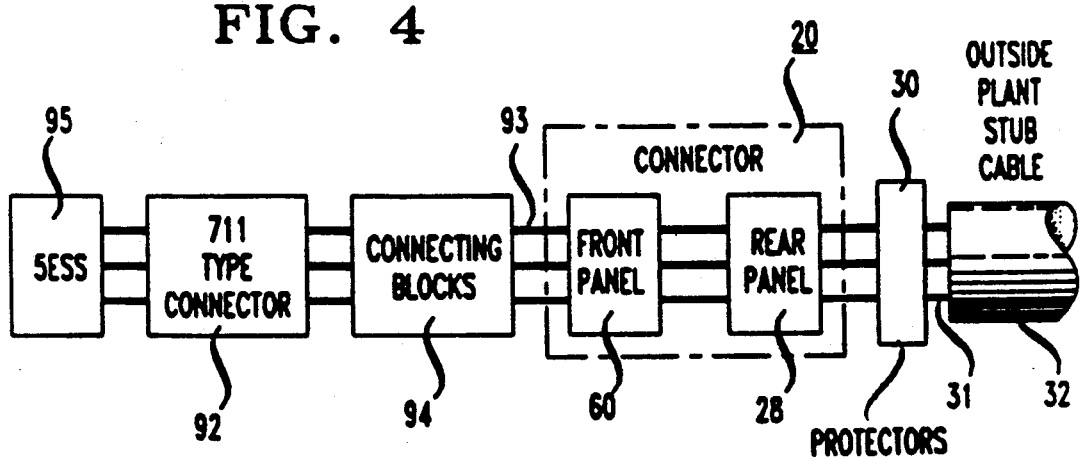
FIG. 4
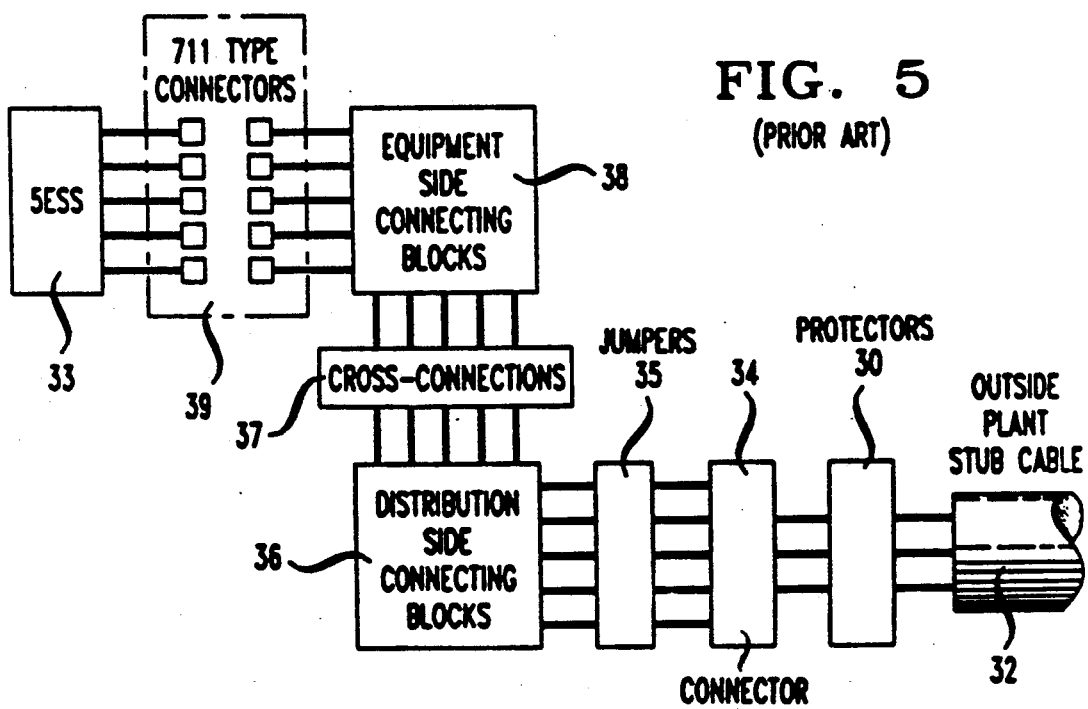
FIG. 5
(PRIOR ART)
FIG. 6
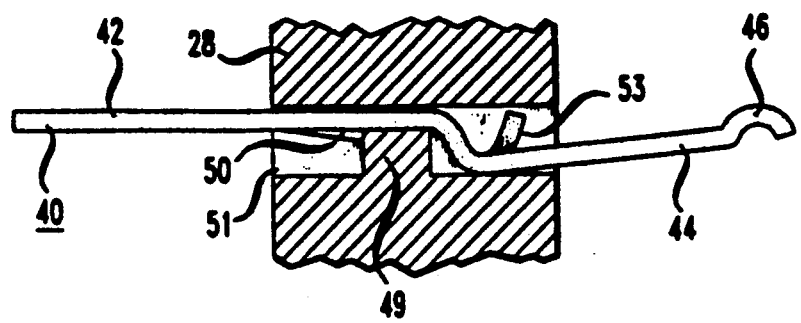

CENTRAL OFFICE CONNECTOR FOR A DISTRIBUTING FRAME SYSTEM

TECHNICAL FIELD

This invention relates to a central office connector for a distributing frame system. More particularly, this invention relates to a connector system which is capable of being used in a central office and which facilitates cutover to a new central office switch or cutover to add additional lines to an existing central office switch.

BACKGROUND OF THE INVENTION

In a central office, a switch or other electronic equipment is connected to a main distributing frame. The function of the main distributing frame is to provide line protection, to facilitate cross-connecting and to facilitate testing. In one connector which is associated with the main distributing frame, the functions of protection and testing are provided.

Typically, an outside plant cable is routed to a connector. Each conductor pair is terminated in a manner to be connected to a plug-in type protector. The protector also is connected to contact elements mounted in a rear panel. A front panel includes a mass of contact elements aligned with those of the rear panel and in electrical engagement therewith. The contact elements of the front panel are connected through jumpers to equipment such as central office switches, for example.

Provisions also must be made in the central office for adding additional lines to a switch and/or for cutting in lines of a plurality of customers to a new switch. The prior art includes methods and devices for effecting cutover. For example, there is a connector system which is referred to as a 711 connector system. Such a system is disclosed in U.S. Pat. No. 4,099,822 which issued on Jul. 11, 1978 in the names of A. W. Carlisle and D. R. Frey. The 711 connector includes a connector module and a bridging module.

One problem with the above-described system is that each such system may be used only on a limited number of pairs of insulated metallic conductors. As a result, cutover is accomplished in twenty-five pair line segments. This has been acceptable practice in the United States. However, in Europe, what is desired is that all the lines associated with a single switch be cut over at one time. Also, use of the aforementioned 711 system requries a presser type tool which is needed to cause one portion of the connector to be assembled to another portion.

In one method of arranging a cutover to a switch, for example, the plug-in protectors are pulled out to a detent position so that the switch is disconnected from outside plant cable as the conductors thereof are connected to ones of the protectors. After jumpers which are connected to equipment are connected to the contact elements in the front panel and the incoming cables connected to terminals into which the protectors are to be plugged, a craftsperson pushes each protector into a seated position. As should be apparent, this is a very time consuming process. Ideally, all the protectors are seated in a factory and other means used in the field to connect simultaneously all the protectors to equipment such as a switch, for example.

The prior art also includes a system for effecting cutover of a very large number of customer lines at one time. Such a system includes a mass of electrically conductive clips which are often referred to as split beam or bifurcated contact elements. In the prior art connecting arrangement, a plurality of split beam type connectors are mounted in a front face panel. Each of the split beam connectors may be a trifurcated contact element such as is disclosed in U.S. Pat. No. 4,421,374 which issued on Dec. 20, 1983 in the names of L. M. Montilla, Jr. and A. Uchuck. Each trifurcated contact includes a body portion which includes two generally parallel conductor-receiving slots to form a center portion and two outer beams. Each of the outer beams may be displaced relative to the center portion to allow a portion of an insulated conductor to be moved into the slot. When a conductor is moved into a slot, edge portions which define the slot displace insulation of the conductor and engage the conductive portion of the insulated conductor. Electrical continuity is thereby established between the insulated conductor which had been moved into the slot and an opposite end of the trifurcated portion.

Aligned with an opposite end of each trifurcated contact element is a finger of a metallic contact element. The contact element is connected to a cable such that conductors of the cable are connectable through the contact element and the trifurcated contact element to jumpers which are connected to the trifurcated contact elements. Electircal contact between the two contact elements is prevented inasmuch as a leading portion of the finger is held spaced apart from the trifurcated contact element by a strip of insulation. The strip of insulation extends between a plurality of aligned sets of fingers and trifurcated contact elements. One end portion of the strip of insulation includes an opening. A plurality of the rows of the trifurcated contact elements extend from the front face panel with the openings in the end portions of the insulative strips being generally aligned. A strand material such as a cord extends through the aligned openings of the strips. When cutover is desired, a craftsperson pulls the strand outwardly thereby to remove the strips of insulation and cause the fingers to engage electrically associated ones of the trifurcated contact elements.

Although the just-described arrangement provides for effective cutover of a mass of customer lines, it does have at least one shortcoming. Once the strips of insulation material have been pulled and connections established, it would be a difficult if not economically prohibitive task to cause disconnection of the mass of lines.

What is desired is a connector system which is particularly suited for use in a central office to effect cutover simultaneously of a mass of customer lines in a manner more simply than those available in the prior art. The sought after arrangement should be one which after connection is capable of disconnection as desired. Of course, the connective arrangement should be such that the connection and disconnection of the mass of customer lines is easily carried out.

SUMMARY OF THE INVENTION

The foregoing problems of the prior art have been overcome by a connector of this invention. A connector comprises a plastic housing and a first panel which is supported by the housing. The first panel includes a plurality of first contact elements, each having one portion which extends from the first panel and another portion which is adapted to be connected to an electrical conductor. The one portion of each first contact element is resilient and capable of being deflected.

A second panel includes a plurality of second contact elements which are mounted on the second panel such that one portion thereof is secured within a cavity of the second panel and another portion extends from the second panel. The second panel is mounted on the housing such that the one portion of each first contact element extends into juxtaposition with and overlaps but is spaced from the one portion of an aligned, associated second contact element and in an electrically disconnected position is spaced therefrom by a web of plastic material of the second panel.

The connector also includes facilities for allowing relative motion to be caused between the first and second panels to cause a portion of the one portion of each second contact element to become disengaged from the web of plastic material and to engage electrically a portion of the aligned associated first contact element. In this way, electrical connection is achieved simultaneously between a mass of aligned contact elements.

BRIEF DESCRIPTION OF THE DRAWING

Other features of the present invention will be more readily understood from the following detailed description of specific embodiments thereof when read in conjunction with the accompanying drawings, in which:

FIG. 4 is a schematic view of an arrangement in which connectors of this invention are used;

FIG. 5 is a schematic view of a prior art arrangement for connecting circuits to equipment;

FIG. 6 is an enlarged view of a contact element of a mass which are arranged in rows and columns of the rear panel of the connector;

DETAILED DESCRIPTION

Figure 1:
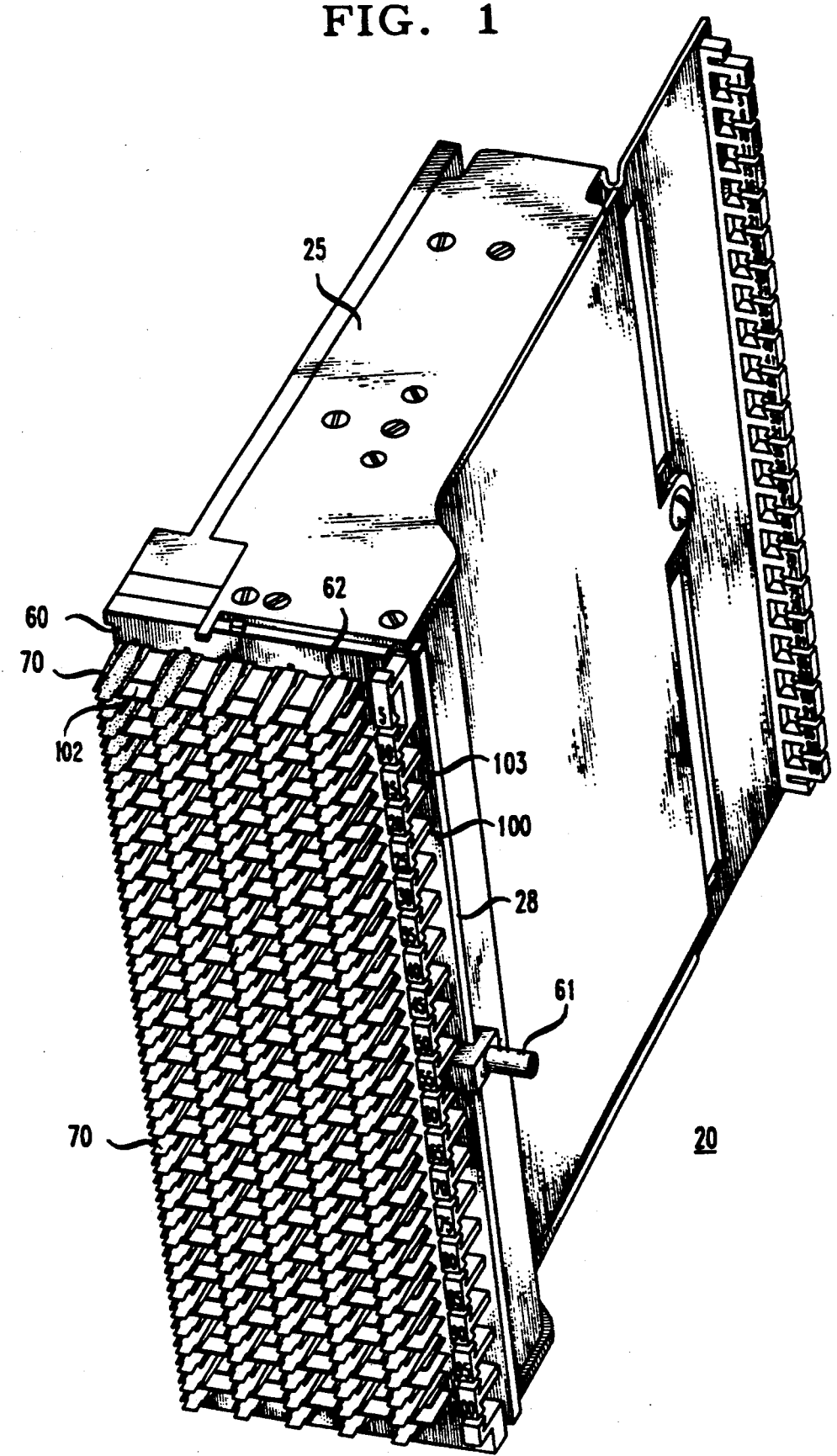
FIG. 1 is a perspective view of a connector of this invention which includes a housing and front and rear panels.

Referring now to FIG. 1, there is shown a connector which is designated generally by the numeral 20 and which includes provisions for cutting over simultaneously a mass of communications lines. The connector 20 includes a housing 25 which includes a first or rear panel 28. The rear panel 28 is attached to one end of the housing 25.

Figure 2:
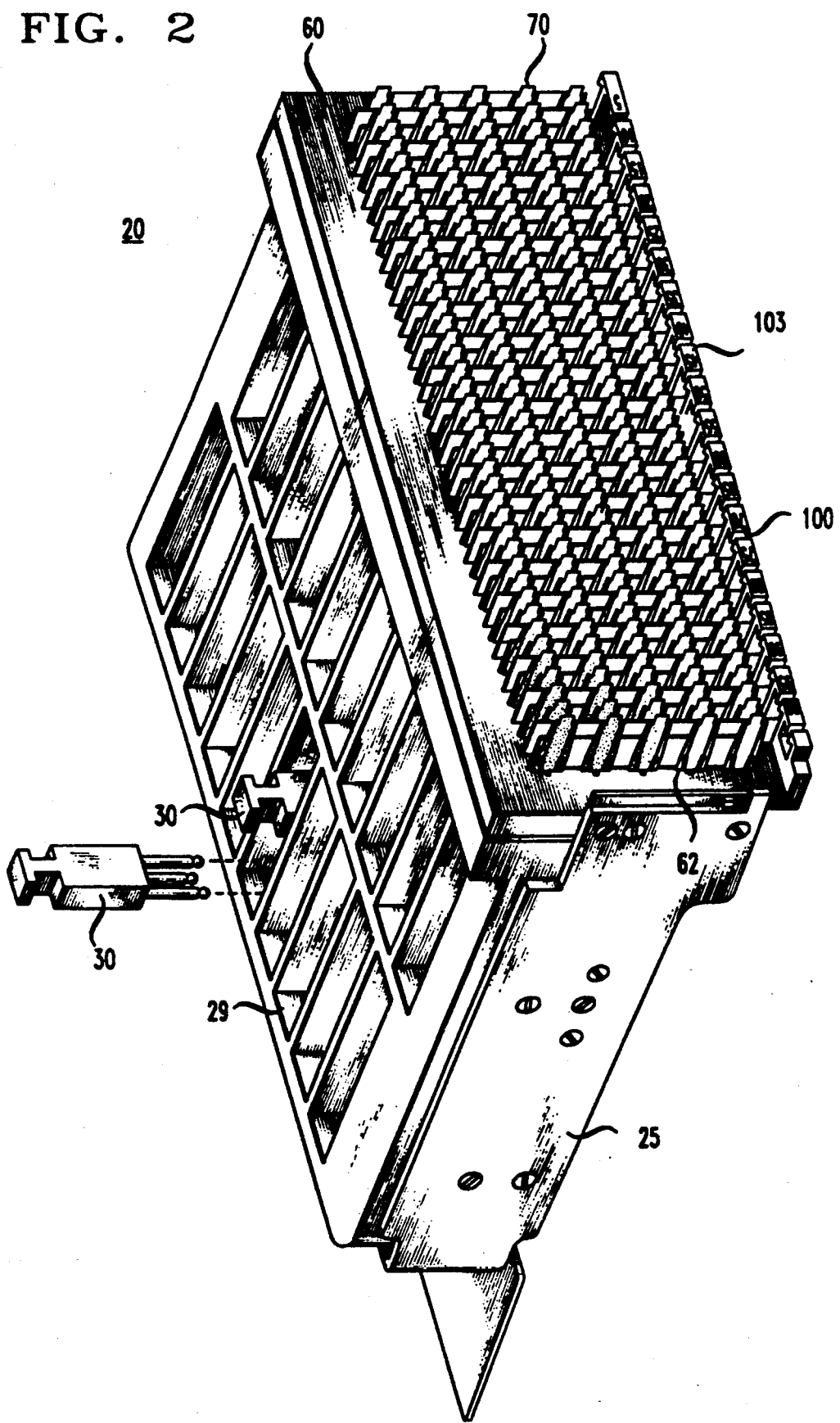
FIG. 2 is a perspective view of the connector of FIG. 1 to show compartments for receiving protectors.
Figure 3:
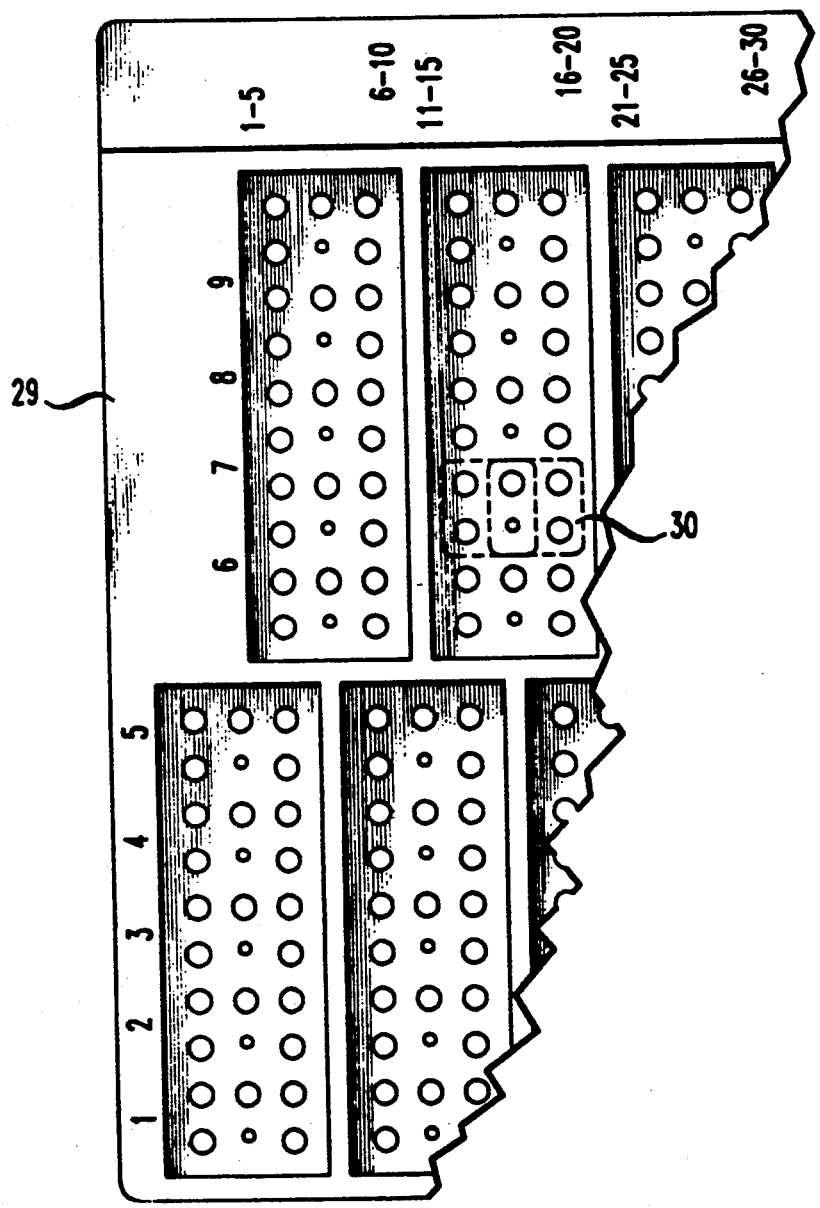
FIG. 3 is a side elevational view of the connector of FIG. 1 which shows facilities for mounting the protectors.

On one side of the housing are formed a plurality of compartments 29—29 (see FIG. 2) each of which is adapted to have mounted therein a plurality of protectors 30—30 (see also FIG. 3). A typical protector is disclosed in U.S. Pat. No. 4,736,269 which issued on Apr. 5, 1988 in the names of J. M. Amein, F. J. Garner, E. W. Horne, R. A. Levandoski, C. McGonigal and R. L. Sweatt. See also U.S. Pat. No. 4,458,288 which issued on Jul. 3, 1984 in the names of J. L. Chapman, T. A. LaValle, and P. S. Nelson.

Each protector 30 is associated with a pair of tip and ring conductors 31—31 (see FIG. 4), which are included in a cable 32 that extends from the vault in a basement of a building, for example. Each conductor pair is brought into the connector 20 and terminated in a well known manner which facilitates electrical connection to a plug-in protector. The cable 32 extends to one or more of the connectors 20—20. In each connector 20, each conductor pair of the cable 32 is connected to a customer, for example. In the future, it may become necessary to cut over all the conductors of the cable to a new central office switch. Further, in some market areas, it is required that this cutover be effected simultaneously for all the pairs.

In FIG. 5 is depicted a prior art arrangement for connecting outside plant cable to a central office equipment 33. The outside plant cable 32 is connected to a connector 34 which through jumpers 35—35 is connected through distribution side connecting blocks 36—36 and through cross connections 37—37 to equipment side connecting blocks 38—38. Conductors from the equipment side connecting blocks 38—38 are connected to a connector module of a 711 connector system 39 mentioned hereinbefore. Conductors from the equipment 33 also are connected to elements of the 711 connector system 39. These elements are plugged into a housing to cause electrical connection to be made between the equipment 33 and the cable 32. Disadvantageously, the connections in the past have been made in groups of only twenty five or thirty two.

Figure 7:
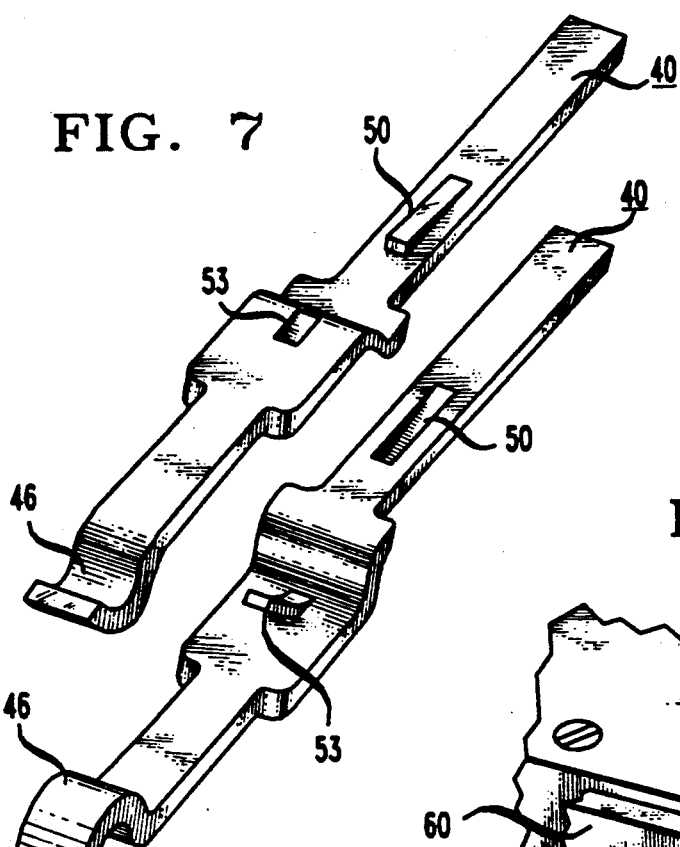
FIG. 7 is an enlarged perspective view of two of the contact elements which are mounted in the rear panel.

In the inventive connector 20, each conductor of each pair is connected to a metallic contact element 40 (see FIGS. 6 and 7) which is mounted in the rear panel 28. The connection between each conductor and its associated contact element 40 may be a wire-wrapped connection, for example. As can best be seen in FIG. 6, each contact element 40 includes linear portions 42 and 44 which are generally parallel to each other but which are offset. Also, the linear portion 44 is formed at a relatively small angle, e.g., about 5°, to a longitudinal axis of the linear portion 42. A free end portion 46 of the contact element 40 is hook-like. A portion of the linear portion 42 of the contact element 40 is disposed between a projection 49 of the rear panel within an aperture 51 in which the contact element is seated and an opposing wall of the rear panel 28. This secures the contact element against unintended transverse movement. Each contact element 40 also includes a detent 50 which is formed on one side of the linear portion 42 and which engages the projection 49 to secure the contact element against unintended longitudinal movement. Another portion 53 of the contact element 40 which is formed near the offset functions to secure the contact within the aperture. Each of the linear portions 44—44 of the mass of contacts extends outwardly at an angle from the rear panel whereas the portions 42—42 extend rearwardly to have conductors which are connected thereto connected to the protectors 30—30. The contact elements 40—40 are made of a resilient material so that each portion 42 and 44 thereof may be deflected and spring-returned when the force causing deflection is removed.

Figure 8:
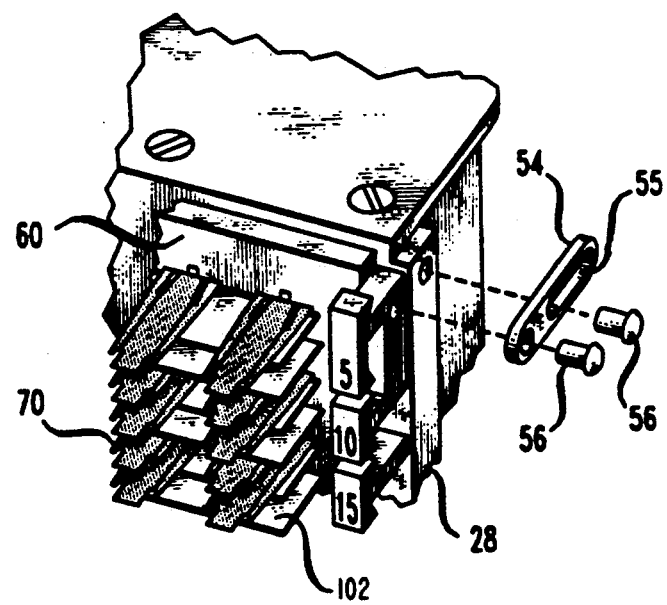
FIGS. 8 and 9 are perspective views of an arrangement for mounting slidably the front panel with respect to the rear panel.
Figure 9:
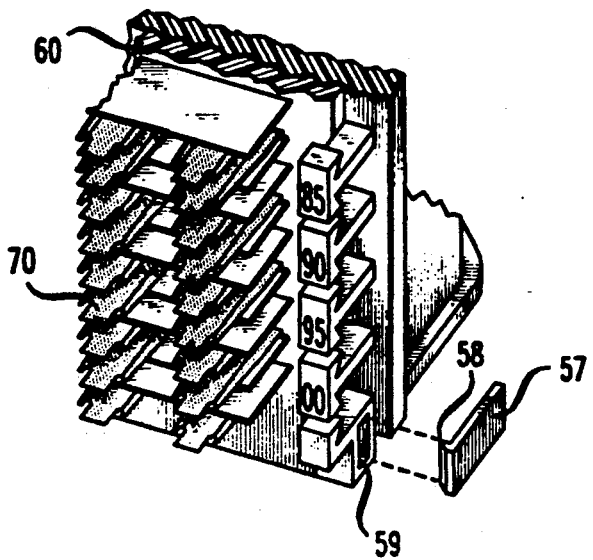

Slidably mounted on the housing 25 is a front panel which is designated generally by the numeral 60 (see FIGS. 1 and 2). In one arrangement which is shown in FIGS. 8 and 9, a link 54 on each side of the connector 20 having a slot 55 is secured to the front panel 60 by a pin 56. Another pin 56 extends through the slot 55 into the rear panel 28. A latch 57 attached to a lower portion of the rear panel 28 on each side of the connector includes a hooked end 58 which is adapted to be received in an opening 59 in the front panel to hold the front panel in an apparatus portion with respect to the rear panel. Pins (not shown) attached to the front panel extend into apertures (not shown) in the rear panel to guide movement between the front and rear panels. A stop 61 (see FIG. 1) is provided to stabilize the front panel 60. As a result, the front panel may not be moved inadvertently toward the rear panel or canted with respect thereto.

Figure 10:
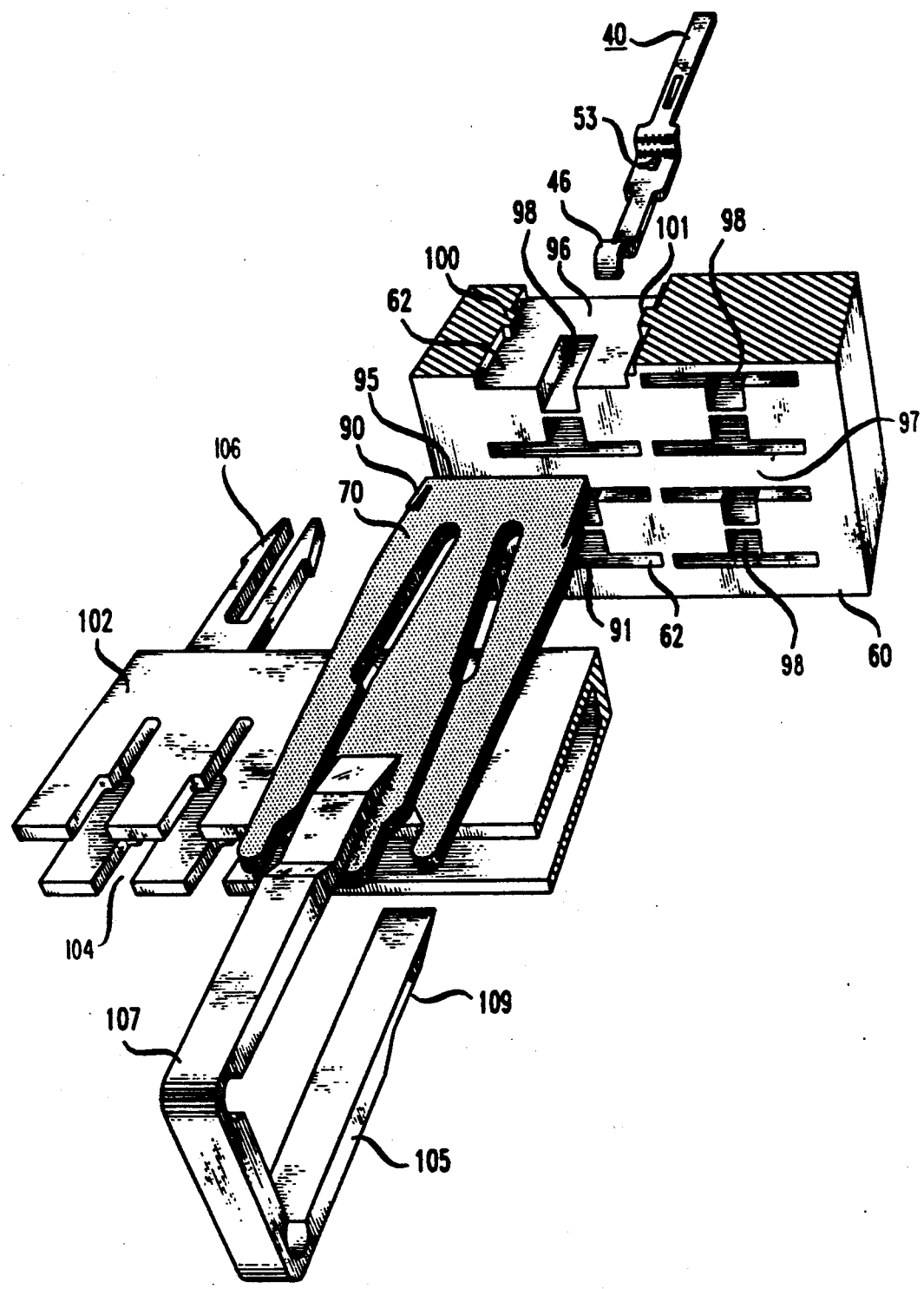
FIG. 10 is an exploded perspective view of a portion of the front panel with a trifurcated contact element aligned with an aperture in the panel and with a contact element extending from the rear panel toward the front panel.

The front panel 60 (see FIGS. 1 and 10) includes a plurality of cavities 62—62 formed therein and arranged in a plurality of rows and columns. The arrangement of rows and columns of the cavities in the front panel is such that each of the cavities 62—62, after assembly of the front panel with the housing 25, is aligned generally with the hook-like portion of one of the contact elements 40—40.

Figure 11:
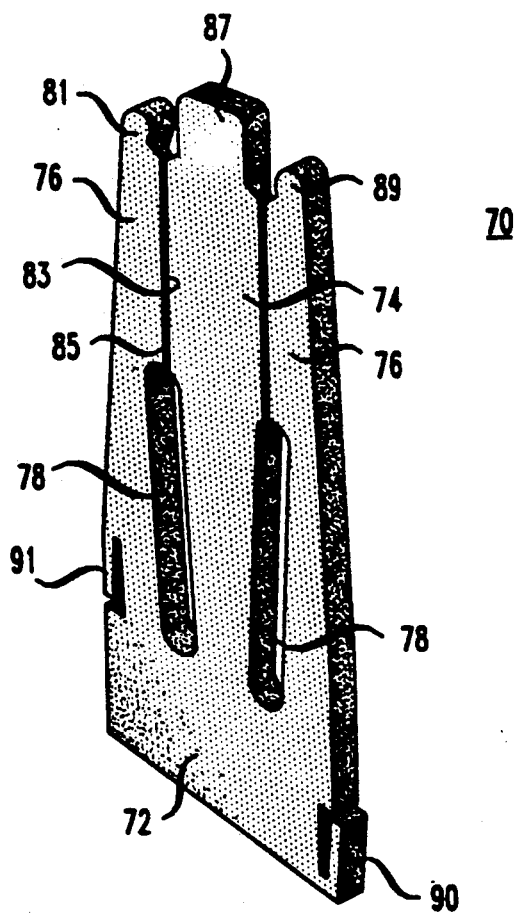
FIGS. 11 and 12 are perspective and front elevational views, respectively, of a trifurcated contact element a mass of which are arranged in rows and columns of the front panel which is moveable relative to the rear panel.
Figure 12:
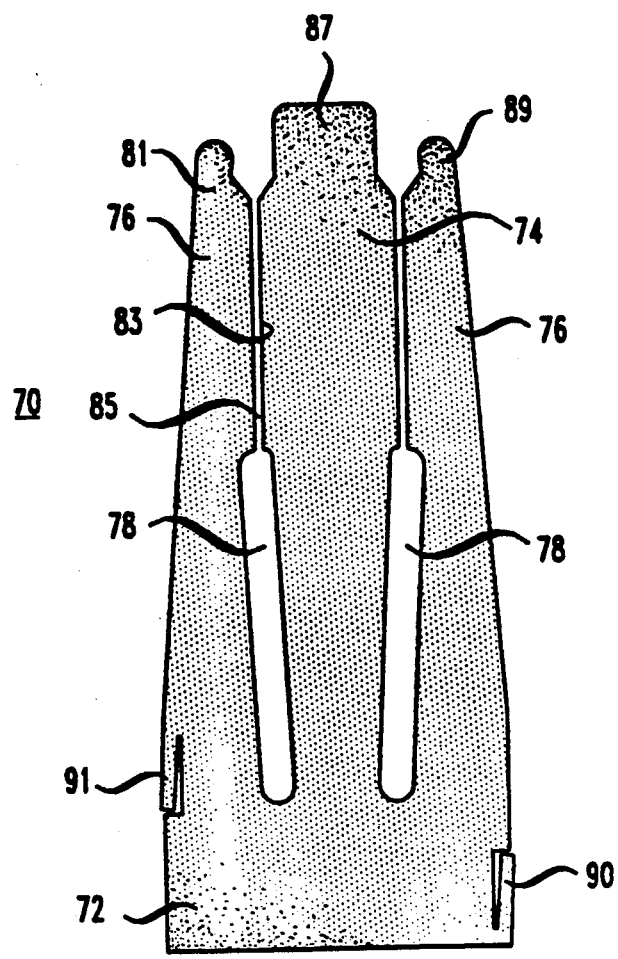

Each of the cavities 62—62, after assembly of the front panel with the housing 25, is adapted to have received therein a portion of a quick-clip contact element 70 which is best seen in FIGS. 11 and 12. The quick-clip contact element is often referred to as a trifurcated contact element and is disclosed in U.S. Pat. No. 4,421,374 which was mentioned hereinbefore. The trifurcated contact element 70 includes a base portion 72 from which extends a center portion 74 and two side beams 76—76. Each of the side beams 76—76 and the center portion 74 are formed to provide an elongated slot 78 therebetween and to have closely adjacent portions 81—81 and 83—83. The closely adjacent portions 81—81 and 83—83 form insulated conductor-receiving slots 85—85. The elongated slot 78 between each side beam and the center portion allows the side beam to flex and permit an insulated conductor to be moved into the slot 85. Free-end portions 87 and 89 of the center portion 74 and the side beams 76—76, respectively, are formed to provide conductor-receiving entrances for the slots 85—85. Also, as should be observed from FIGS. 10 and 11, the contact element 70 is provided with resilient, cantilevered detents 90 and 91 along side edge portions thereof. As is seen, the detents 92—92 are offset in the direction of a longitudinal axis of the contact element. The detents are arrayed so that when the free ends thereof are depressed, the detents move pivotably in the same rotational direction.

As can be seen in FIG. 4, the trifurcated contact elements 70—70 in the front panel 60 are on the so-called equipment side of the connector 20. Jumpers 93—93 extend from the trifurcated contact elements 70—70 to connecting blocks 94—94 which in turn are connected to 711 connectors 92—92 disclosed in U.S. Pat. No. 4,099,822 which issued on Jul. 11, 1978 in the names of A. W. Carlisle and D. R. Frey and which is incorporated by reference hereinto. From the 711 connectors, conductors are run to equipment 95 such as a new switch, for example, to which the conductor pairs which are connected to the protectors are to be connected simultaneously. Whereas in the prior art, the means of effecting cutover include the 711 connector system, for example, cutover in the arrangement of this invention is made through the connector 20.

Figure 13:
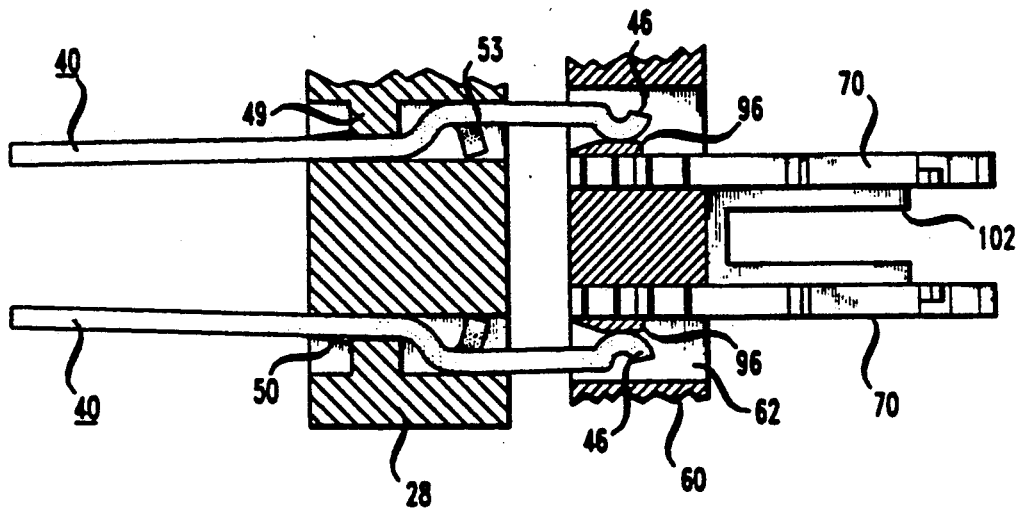
FIG. 13 is an enlarged side elevational view of two trifurcated contact elements of a mass thereof in the connector of FIG. 1 in a disconnected position with respect to aligned contact elements which are mounted in the rear panel of the housing.
Figure 14:
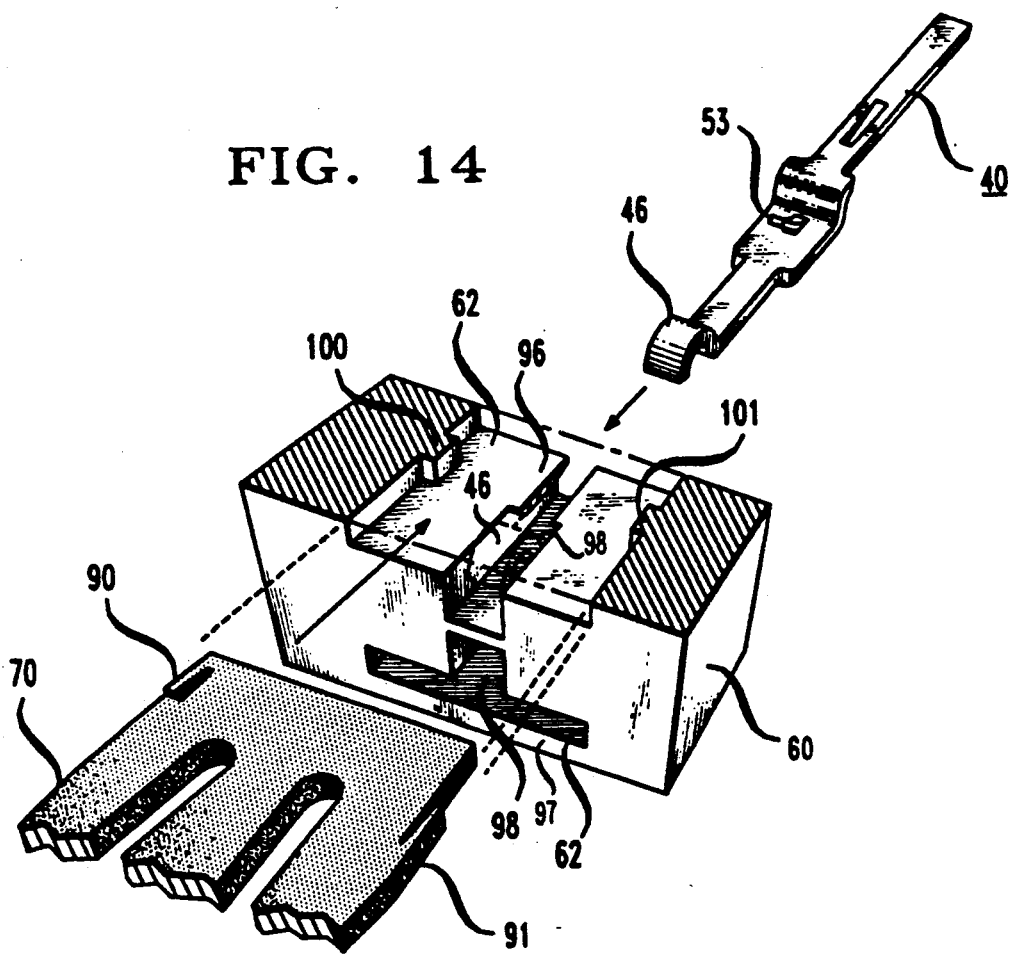
FIG. 14 is an exploded perspective view of a portion of the front panel to show a contact element and a trifurcated contact element and a mounting arrangement in the front panel for the trifurcated contact element with a web-like portion of the panel which separates portions of aligned contact elements in an electrically disconnected position broken away for purposes of clarity.
Figure 15:
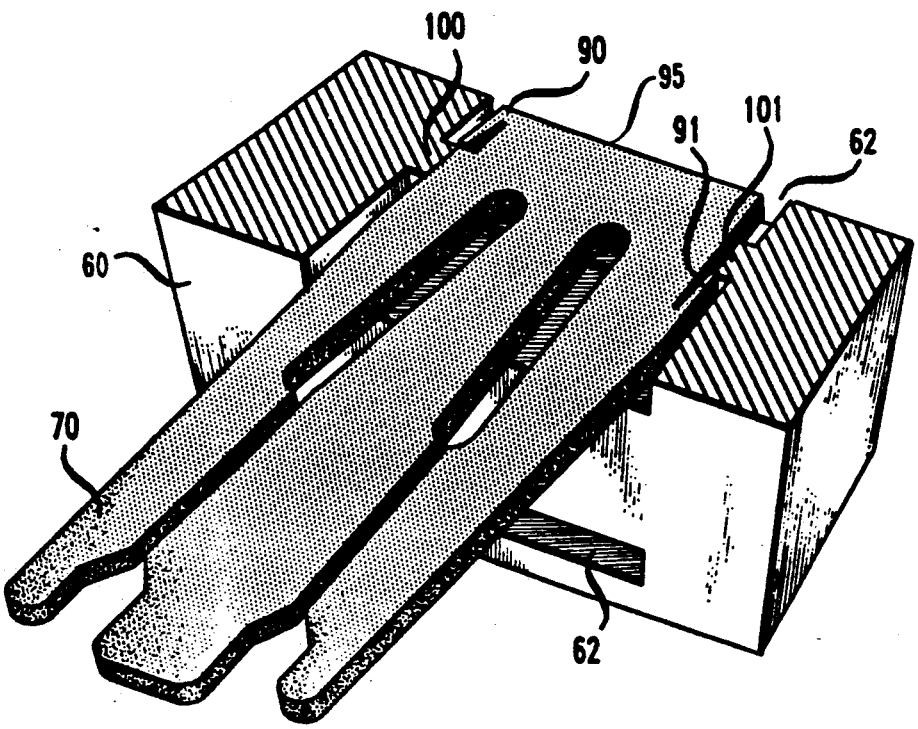
FIG. 15 is an enlarged perspective view of a trifurcated contact element secured within the front panel.

Viewing now FIGS. 10 and 13-15, it can be seen that each of the trifurcated contact elements 70—70 is mounted in a cavity 62 in the front panel to cause a portion of the base portion of each to be disposed between a partition in the form of a web 96 of the housing and a wall 97 which separates adjacent cavities 62—62. As a trifurcated contact element is moved into and along a cavity 62, the detent 90 which is nearer an outer edge 95 (see FIG. 15) of the base 72 is depressed as it moves past a lip 100 within the cavity. Upon further movement, the detent 90 snap-locks behind its associated lip 100. At the same time, the other detent 91 of the contact element 70 abuts the opposed lip 101 within the cavity to secure the contact element within the cavity. A portion of the base portion of each trifurcated contact element which is most closely adjacent to the elongated slots 78—78 is exposed to a channel 98 which is defined by the web 96 and to which opens the cavity 62 in which the trifurcated contact element is mounted. In FIG. 14, the web 96 of a cavity 62 is broken away to show the channel 98 into which the hook-like portion 46 of an aligned associated contact element 40 extends.

As described hereinbefore, the front panel is mounted on the rear panel 28 so that the front panel is moveable slidably between a first position in which the hook-like portion 46 of each contact 40 is in engagement with the web 96 of the cavity 62 in which is disposed the associated aligned trifurcated contact element 70 (see FIG. 13). This position of the front panel with respect to the rear panel is referred to as an electrically disconnected position in that because of the web of dielectric material between overlapped portions of each contact element 40 and its associated trifurcated contact element 70, an electrical connection is not established and new equipment is not yet connected to the conductor pairs of the cable.

When it is desired to effect a connection of all the conductors of the incoming cable to the new equipment, for example, a craftsperson applies forces to the front panel 60 to cause the front panel to be moved slidably along the housing 25 toward the rear panel 28. After the front panel 60 has been moved to a second position, each web 96 of dielectric material in each cavity 62 is moved with the front panel from engagement with the hook-like portion 46 of its associated contact element 40 (see FIG. 16). Inasmuch as the rear panel 28 is fixed with respect to the housing, each contact element 40 remains stationary as relative motion is caused between the front and the rear panels. This causes each hook-like portion 46 of each contact element 40 to extend farther into its associated channel 98 past the web 96 thereof (see also FIG. 14). This allows the hook-like portion of each contact 40, because of its resiliency, to be biased inwardly toward the associated, aligned trifurcated contact element 70. As a result, there is electrical engagement of each contact element 40 with an aligned, associated trifurcated contact element 70.

Advantageously, although the above-described arrangement has utility for effecting cutover by causing simultaneously engagement of a mass of contact elements with a mass of other contact elements, the connector also may be used to effect disconnection of an existing mass of connections. Should it be desired to disconnect the jumpers 93—93 (see FIG. 4) which extend to and are connected to the new equipment 95, the craftsperson applies forces to the front panel 60 to cause the front panel to be moved in a direction away from the rear panel 28 and into its first or electrically disconnected position. This causes the hook-like end portion 46 of each contact element 40 to be retracted within its associated channel 98 and to be moved into engagement with the web 96 of dielectric material which defines its associated channel. As a result, electrical engagement between each contact element 40 and its associated trifurcated contact element 70 is discontinued and the panels 28 and 70 now occupy what is referred to as the electrically disconnected position.

Also disposed along an edge portion of each front panel is a fanning strip 100 (see FIG. 1). The fanning strip is used to organize the jumpers 93—93 routed from each of the rows of the trifurcated contact elements to equipment in a central office, for example.

Figure 16:
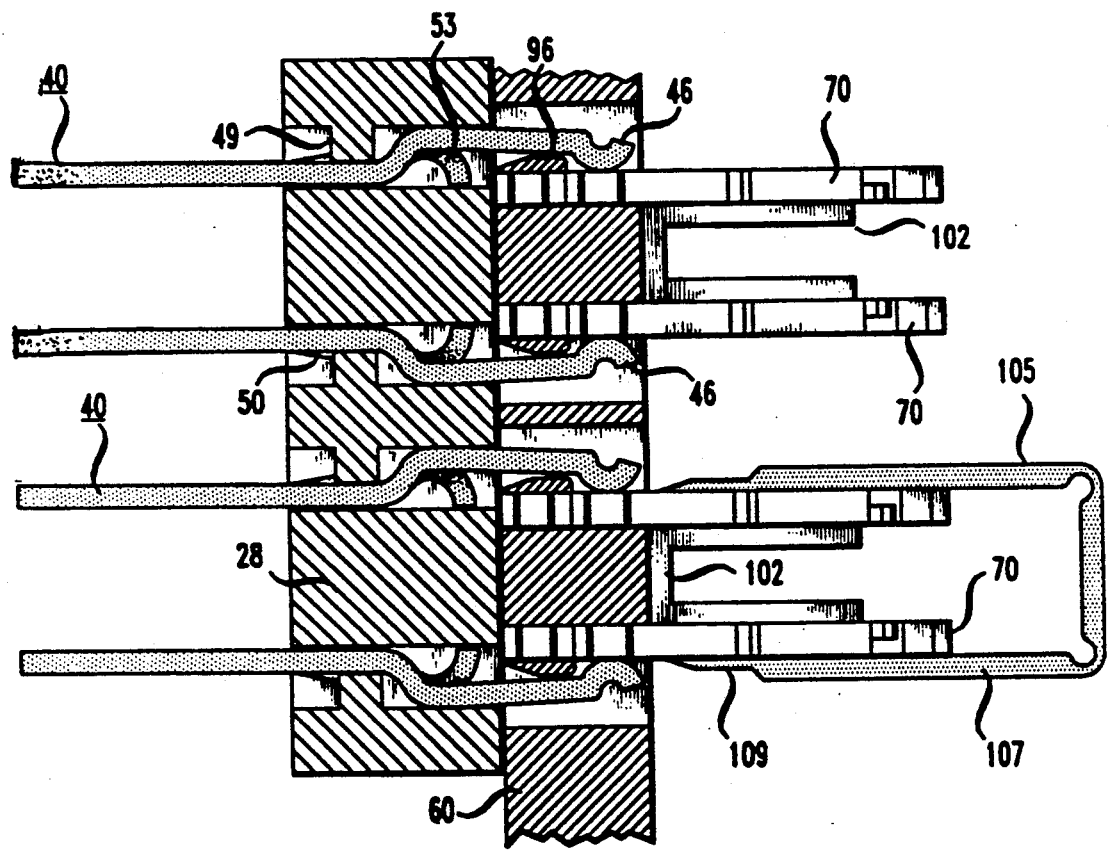
FIG. 16 is a side elevational view of trifurcated contact elements of FIG. 11 after the front panel has been moved relative to the rear panel to cause electrical connections between the contact elements and the trifurcated contact elements.

As can be seen in FIGS. 1, 13 and 16, the trifurcated contact elements 70—70 are arranged in pairs. Between the portion of the contact elements 70—70 of each pair which extend outwardly from the front panel is a U-shaped guide strip 102 (see also FIG. 10). Each guide strip 102 is made of a dielectric material and extends between two rows of paired contact elements 70—70. The guide strip 102 is secured to the front panel by protruding bifurcated detents 106—106 (see FIG. 10) which are received in openings in the front panel. Jumpers 93—93 which are received in the conductor-receiving grooves of the contact elements 70—70 are routed through aligned openings 104—104 of a guide strip 102 into the guide strip and extended along the guide strip through an opening 103 (see FIG. 1) in the fanning strip 100. The guide strip 102 provides strain relief for the jumpers 93—93. Without the strip 102, any pull in a jumper is transmitted to the contact element 70 to which it is connected.

Figure 17:
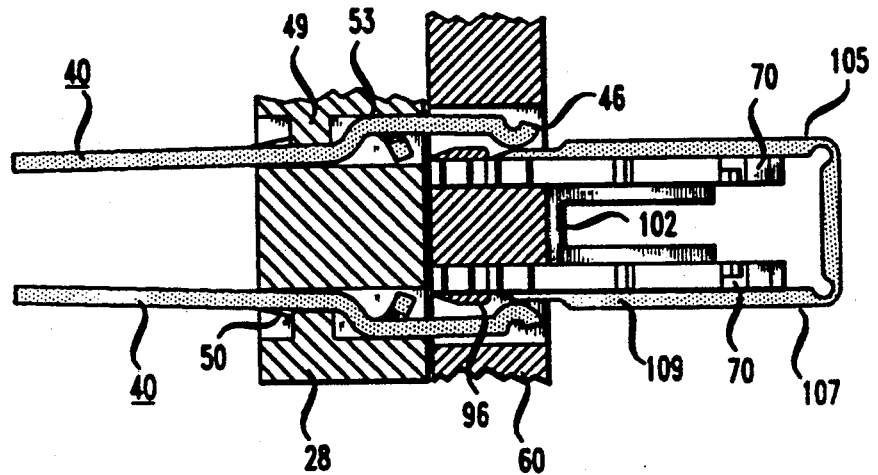
FIG. 17 is an enlarged view of a trifurcated contact element of FIG. 10 after a test probe has been moved into electrical engagement therewith for testing.

The connector block 20 also allows for testing of the conductive paths to the equipment. This is accomplished by causing test probes 105—105 (see FIGS. 10, 16 and 17) to be moved into engagement with portions of pairs of contact elements 70—70 which portions extend outwardly from the front panel 60. Each test probe is U-shaped and includes leg portions 107—107 having wedge-shaped end portions 109—109. The wedge-shaped portions are adapted to be moved to become interposed between the resilient hook-like end portions 46—46 of the contact elements 40—40 and the associated trifurcated contact elements 70—70 when the hook-like portions are in engagement with an associated contact element 70.

Figure 18:
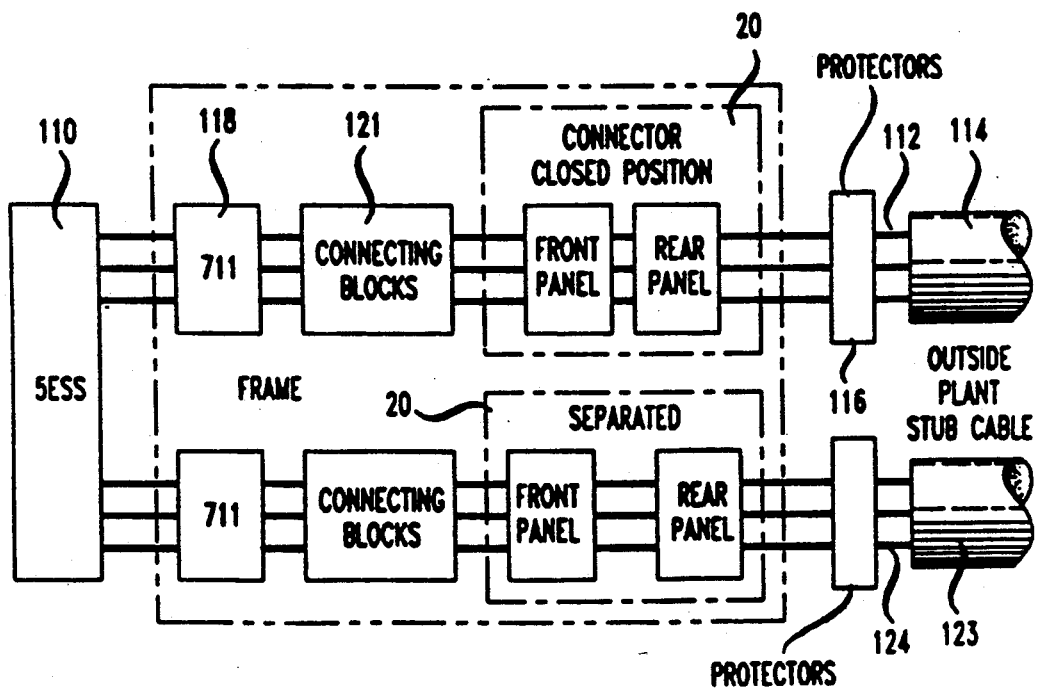
FIG. 18 is schematic view of a wiring arrangement in which connectors of this invention may be used to connect additional customer lines to central office equipment.

Referring to FIG. 18, there is shown an application of the connector 20 to the addition of lines to a central office switch 110. Priorly, conductors 112 of a cable 114 had been connected through protectors 116—116 mounted in a connector 20 to contact elements 40—40 thereof. A front panel 60 had been moved to an operative position to cause trifurcated contact elements 70—70 mounted therein to be moved into electrical engagement with associated ones of the contact elements 40—40. This caused the cable 114 to be connected through connecting blocks 121—121 and 711 connector systems 118—118 to the switch 110. At a later date, when it may be desired to connect additional lines of a cable 123 to the switch, conductors 124—124 of that cable are connected to another connector 20 in which the front and rear face plate are separated. The contact elements 70—70 of the front panel are connected through to the switch 110. After all the connections of the cable to the connector have been made, a craftsperson moves the front panel toward the rear panel to connect the associated contact elements 70—70 and 46—46 and thereby connect the cable 123 to the switch 110, all circuits of the cable being so connected simultaneously.

It should be apparent that the connector of this invention is advantageous in that by a mere manual pushing action carried out by a craftsperson, a mass of electrical connections are effected substantially simultaneously. This contrasts with prior art arrangements in which presser type tools were required to assemble portions of connectors.

It is to be understood that the above-described arrangements are simply illustrative of the invention. Other arrangements may be devised by those skilled in the art which will embody the principles of the invention and fall within the spirit and scope thereof.

I claim:
1. A connector, which comprises:
   a housing;
   a first panel which is supported by said housing and which includes a plurality of first contact elements each having one portion which extends from said first panel and another portion which is adapted to be connected to an electrical conductor;
   a second panel which includes a plurality of cavities and a plurality of second contact elements which are mounted in said cavities of said second panel such that one portion of each said second contact element is secured within a cavity of said second panel and another portion extends from said second panel and is adapted to be connected to an electrical conductor, said second panel being mounted on said housing such that said one portion of each said first contact element extends into juxtaposition with and overlaps but is spaced from the one portion of an aligned, associated second contact element; and means for mounting said first and second panels to facilitate relative linear motion between said first and second panels in a single direction to cause a portion of said one portion of each said first contact element to become engaged electrically with said one portion of the aligned, associated second contact element.

2. A connector, which comprises:

a housing;

a first panel which is supported by said housing and which includes a plurality of first contact elements each having one portion which extends from said first panel and another portion which is adapted to be connected to an electrical conductor;

a second panel which includes a plurality of cavities and a plurality of second contact elements which are mounted in said cavities of said second panel such that one portion of each second contact element thereof is secured within a cavity and another portion thereof extends from said second panel and is adapted to be connected to an electrical conductor, each said cavity having associated therewith a channel with a partition disposed between a portion of each channel and its associated cavity and said second panel being mounted on said housing such that the one portion of each said first contact element extends into the channel of the cavity of an aligned associated second contact element to overlap said one portion of the aligned, associated second contact element but to be spaced therefrom by the partition which when said second panel is in a first position with respect to said first panel is interposed between said one portion of a second contact element and said one portion of the aligned, associated first contact element; and means for allowing relative motion to be caused between said first and second panels to cause said second panel to be disposed in a second position with respect to said first panel and to cause said one portion of each first contact element to become disposed in another portion of its associated channel which communicates with the associated cavity and thereby allow a portion of said one portion of each said first contact element to engage electrically a portion of the aligned, associated second contact element.

3. The connector of claim 2, wherein said one portion of each said first contact element is resilient and capable of being deflected and is biased toward an aligned, associated one of said second contact elements.

4. The connector of claim 3, wherein each partition is a web which comprises a dielectric material which when said second panel is in a first position with respect to said first panel is interposed between said one portion of each said first contact element that is capable of being deflected and an aligned portion of the associated second contact element.

5. The connector of claim 4, wherein each of said first contact elements comprises a resilient metallic material.

6. The connector of claim 5, wherein when relative motion between said first and second panels is caused to occur, each web of dielectric material becomes removed from disposition between said one portion of each said first contact element and the aligned, associated second contact element thereby allowing the resilient one portion of each first contact element to be urged toward and into engagement with the associated second contact element.

7. The connector of claim 6, wherein each of said second contact elements comprises a trifurcated contact element which includes a center portion and two lateral portions, portions of each lateral portion and said center portion cooperating to provide a conductor-receiving slot which extends toward a base from which said center and said lateral portions extend.

8. The connector of claim 6, wherein each said second contact element includes means for causing said each second contact element to be secured within a cavity of said second panel.

9. The connector of claim 8, wherein said second contact elements are arranged in rows and columns with a guide strip being positioned between associated pairs of rows, said strip being effective to receive conductors which are terminated by having end portions thereof received in said conductor-receiving slots.

10. The connector of claim 9, wherein each said guide strip including a plurality of slots with each slot thereof being aligned with conductor-receiving slots of an aligned pair of second contact elements to provide strain relief for conductors which extend from slots in said second contact elements through aligned slots in said guide strip and routed along said guide strip.

11. The connector of claim 9, wherein said first panel is fixedly attached to said housing and said second panel is mounted on said housing so that said second panel is capable of being moved toward or away from said first panel.

12. The connector of claim 11, wherein said second panel also includes a fanning strip which is attached to one edge surface thereof and which spans transversely across ends of a plurality of pairs of rows of said second contact elements.

13. The connector of claim 12, wherein said fanning strip includes a plurality of openings and wherein conductors which are run along said guide strips extend through said openings.

14. The connector of claim 11, wherein disconnection between said first contact elements and aligned, associated second contact elements is caused by moving said second panel in a direction away from said first panel to cause the web of plastic material in each cavity to become interposed between the base of the second contact element within the cavity and said one portion of the associated first contact element which extends into the channel associated with said cavity.

15. The connector of claim 1, which also includes means for connecting test connections to each first contact element and associated second contact elements.

16. The connector of claim 15, wherein said means for connecting test connections includes U-shaped means having legs spaced apart to be moved over outer portions of an associated pair of second contact elements and having wedge-shaped free end portions capable of becoming interposed between said one end portions of said first contact elements and adjacent portions of aligned, associated second contact elements.

* * * * *